Feb. 20, 1951  C. I. BEARD  2,542,462
SURFACE WAVE CANCELLATION ELECTRICAL PROSPECTING
Filed Aug. 27, 1949  4 Sheets-Sheet 1

CHARLES I. BEARD
*INVENTOR*

BY D. Carl Richards
*AGENT*

Feb. 20, 1951             C. I. BEARD             2,542,462

SURFACE WAVE CANCELLATION ELECTRICAL PROSPECTING

Filed Aug. 27, 1949                          4 Sheets-Sheet 2

CHARLES I. BEARD
*INVENTOR.*

BY *D. Carl Richards*
AGENT

Feb. 20, 1951      C. I. BEARD      2,542,462
SURFACE WAVE CANCELLATION ELECTRICAL PROSPECTING
Filed Aug. 27, 1949      4 Sheets-Sheet 3

CHARLES I. BEARD
*INVENTOR.*
BY D. Carl Richards
AGENT

CHARLES I. BEARD
*INVENTOR.*

BY D. Carl Richards
*AGENT*

Patented Feb. 20, 1951

2,542,462

UNITED STATES PATENT OFFICE 2,542,462

SURFACE WAVE CANCELLATION ELECTRICAL PROSPECTING

Charles I. Beard, Dallas, Tex., assignor, by mesne assignments, to Socony-Vacuum Oil Company, Incorporated, New York, N. Y., a corporation of New York Application August 27, 1949, Serial No. 112,741

21 Claims. (Cl. 175—182)

This invention relates generally to the electrical exploration of conductive bodies, more specifically to a method and system for measuring reflected energy without interference from waves propagated along an air interface with said bodies.

More particularly, this invention relates to an electrical prospecting system of the type wherein current pulses are applied at the earth's surface and at a location in predetermined relation to the point of application of the signals resultant potentials are measured. Variations in the aforesaid potentials are interpreted as an indication of the presence or absence of subsurface structural anomalies which present resistivity contrasts and thus reflect to the surface electrical energy received thereby.

Considerable difficulty has been encountered in methods of this type in accurately measuring the potentials due to the current impulses. Even more difficult is the measurement of reflected energy per se which, if present, is but a small component of the detected signal. Even in the idealized case in which there is assumed an absence of noise, the measurement of reflected energy has been deemed well-nigh impossible. With noise potentials present, such as those due to telluric currents, 60-cycle ground currents and the like, the noise potentials may be many times higher than the reflected energy or the boundary wave.

In general, the potential at a boundary between an infinite homogeneous conductor and an infinite homogeneous insulator, appearing as a result of application of electrical energy in the form of impulses or signals at the boundary, consists entirely of a wave travelling along the boundary or interface between the two media. All other energy undergoes pure dispersion. However, where stratification and other inhomogeneities exist in the conductor some of the energy which otherwise would be dispersed therein is reflected back to the surface and is combined with the boundary wave.

I have found that the application of electrical energy in the form of current pulses or alternating current to the surface of the earth likewise causes propagation of a wave front or boundary wave along the surface of the earth at a high velocity, approaching the speed of light. There are also waves travelling down into and reflected from subsurface beds in the earth but at velocities very much lower than that of light, depending at least in part upon the resistivity of the formations. If the earth conductor were homogeneous and infinite in depth and area, the potential anywhere on the surface would consist entirely of boundary wave energy. Since the earth is not homogeneous, the signal at the boundary will be made up of the boundary wave plus the reflected wave. The boundary wave will depend in character upon the magnitude, shape, and frequency of the applied signal, the electrical constants of the conductor and the relative locations of points of application and detection.

In accordance with the present invention, the boundary wave is cancelled from the total detected potential whereby the remaining potential solely represents the reflected energy component.

In effecting the cancellation of the boundary wave in accordance with one embodiment of my invention, current pulses are simultaneously applied at the earth's surface and at the surface of a homogeneous model earth. The amplitude of the current pulses, the spacing between the points of application and detection on the earth and the model, and the resistivity of the model are adjusted to effect the desired boundary wave cancellation when the two detected signals are mixed so that any remaining signal will represent only reflected energy from the earth.

That such cancellation of the boundary wave may be effected will be evident from the following considerations.

For a given signal inductively applied and detected, I have determined that the shape S of the boundary wave is a function F of the expression:

$$S = F \frac{(\mu f R^2)}{\rho} \quad (1)$$

where:

$\mu$ = magnetic permeability of the conducting body or medium
$f$ = frequency
$R$ = spacing between points of application and detection
$\rho$ = apparent resistivity of the conducting body or medium For non-ferrous conductors such as the earth may be considered to be, the magnetic permeability $\mu$ effects are negligible. When such is the case, Equation 1 may be expressed (for a given frequency $f$ as:

$$S = F \frac{(R^2)}{\rho} \quad (2)$$

If the signal is simultaneously applied to the surfaces of two hypothetically infinite homogeneous conductors, having the same resistivities $\rho$, the shape of the boundary wave in both conductors will be identical for all points on the surface spaced R distance from the point of application.

Further, if the two conductors have different resistivities $\rho_1$ and $\rho_2$ there will be spacings $R_1$ and $R_2$ at which the detected wave shapes will be identical. That condition will exist where:

$$\frac{R_1^2}{\rho_1} = \frac{R_2^2}{\rho_2} \quad (3)$$

Still further, I have found that the amplitude A of the boundary wave is controlled by the following parameters in the following relationship where the signal is inductively applied and detected:

$$A = F' \frac{(IfA_1A_2)}{R^3} \quad (4)$$

where:

I = the magnitude of the applied signal
$A_1$ = the area of the inductive input circuit, ordinarily a current loop; and
$A_2$ = the area of the detecting or potential loop.

From the above Equation 4, it may be deduced that after a wave of desired shape is detected on the surface of the earth, as by adjusting the spacing R, the amplitude may then be controlled or adjusted as by the current I quite independently of those factors governing the shape S, namely $\rho$ and R, and may thus be adjusted within limits to a desired amplitude.

In applying my discovery in determination of variations in certain properties of the earth, it must be recognized that the resistivity of the earth can not be readily changed or controlled to satisfy requirements of the above Equation 3. However, the shape of the boundary wave is a factor which may be varied independently of $\rho$ and is determined, in a given area and for a given applied signal, by the spacing R between, for example, an exciting or current loop and a detecting or potential loop forming a part of an exploring system. Thus, the shape of a detected boundary wave may be controlled by selecting the spacing R independent of resistivity $\rho$.

It has been found that a boundary wave may be generated and detected on a model which wave may be so adjusted as to shape and as to amplitude to be identical with the boundary wave component of the signal detected on the earth and is thus capable of effecting boundary wave cancellation when properly mixed. More specifically, and in accordance with the present invention, the resistivity of the model ($\rho_{model}$) and the spacings ($R_{earth}$) and ($R_{model}$) are selected or varied to satisfy Equation 3, e. g.:

$$\frac{R^2_{earth}}{\rho_{earth}} = \frac{R^2_{model}}{\rho_{model}} \quad (5)$$

The detected potentials are then mixed out of phase in a measuring circuit and the amplitude adjusted for cancellation of the boundary wave portion of the earth potential and the remaining energy reflected from subsurface beds is measured without interference from the boundary wave.

In the preferred form of the invention, there is provided timing means for determination of the time of occurrence of each reflection with respect to the time of generation of the electrical pulse giving rise to such reflection. Accordingly, the methods and calculations utilized in seismic prospecting may be applied in determination of the depth and character of subsurface formations.

In accordance with a further aspect of the invention, the reflections may be detected with the effect of random noise thereon substantially entirely eliminated. When it is recalled that the potentials or voltages representing random noise energy in the earth have magnitudes much greater than those of the reflected signals, the importance of this aspect of the invention will be fully appreciated. Periodic or repetitive signals in the form of electrical pulses are applied to the earth and the resulting boundary waves cancelled as described above. The periodic signals detected at a receiving station are then repeatedly chopped into a plurality of successive components. Since the pulses to the earth, and those detected, may occur at the rate of from ½ to 30 times per second, it will be appreciated that the subdivision of each pulse may be made relatively great by providing a commutator with a large number of conducting segments respectively insulated one from the other. The commutator is rotated in synchronism with the pulse-producing device, so that the commutator may complete a revolution during the application of a single pulse to the earth. Thus, each impulse is applied through a charging resistor to a brush (which may be rotated, instead of the commutator) to apply to each conducting segment a voltage component, the duration of which will be dependent upon the time of contact between the brush and one of the conducting segments. To each conducting segment is connected a capacitor, the several capacitors preferably being of identical size and characteristic. During the time the commutator, or its associated brush, completes a revolution, an incremental charge applied to a capacitor is stored therein. By means of a second brush, the voltage represented by the charge ultimately stored on each capacitor by repeated application of incremental charges is applied to a detecting device, such as an oscilloscope, to reproduce thereon the voltage wave applied to the plurality of capacitors. The foregoing may, of course, be carried out by other memory devices, or integrating devices.

In accordance with the invention, random noise which appears at intermediate times and whose polarity changes from positive to negative, while effective to modify the applied waveform, is eliminated by the process of integration and storage due to the fact that over a period of time the random noise is averaged out since there is as much random noise in a positive direction as in a negative direction. Thus, the net charge on each capacitor, due to the random noise voltage, will be negligible. The time constant of the charging circuit to the capacitors is made large so that the effect upon the incremental charge due to any one noise impulse is negligible compared to the total charge due to the desired signal thereby so to reduce and eliminate the effect of the random noise.

It has been found that in the absence of high amplitude noise high amplification may be utilized, whereas in the past the random noise energy has effectively saturated the amplifiers, and has obscured the detected signals to a degree to render very difficult the securement of useful subsurface information as a result of electrical surveys.

For further objects and advantages of the invention and for more complete understanding thereof, reference should now be had to the following description taken in conjunction with the accompanying drawings in which.

In describing the invention reference will first be made to Figs. 1–4, and for ease in understanding the invention it will first be assumed that there will be an absence of noise potentials. Thereafter, the invention will be described in connection with the noise-eliminating system by means of which reflected energy may be detected, though the noise potentials may greatly exceed the amplitude of potentials of the boundary wave and, of course, be much greater in proportion to the amplitude of the reflected energy, the detection of which is of primary importance.

Figure 1:
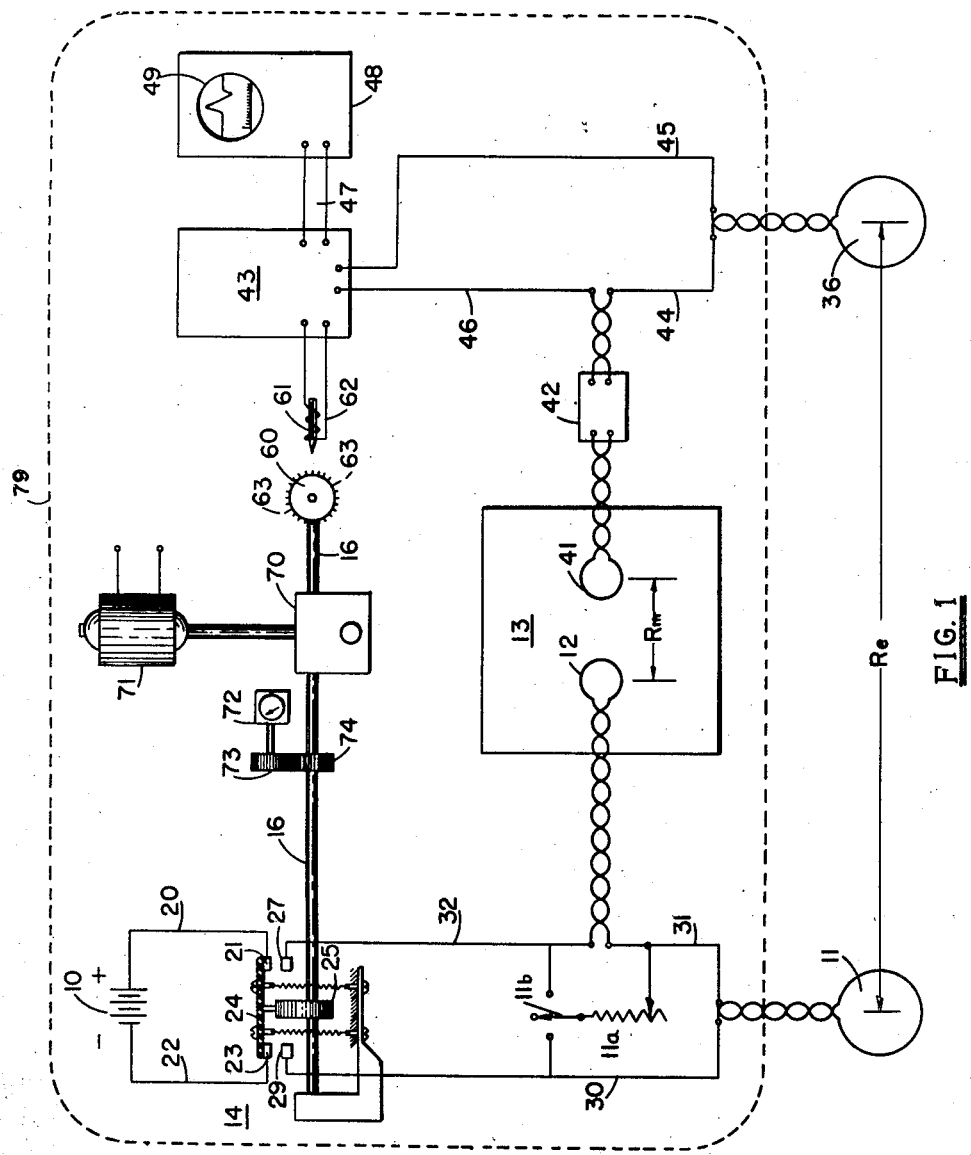
Fig. 1 is a diagrammatic view of an exploring system.

In Fig. 1, a source of direct current 10 is utilized to energize a primary exciting loop 11 positioned on the surface of the earth, and additionally to energize a secondary exciting loop 12 positioned at a selected point on the surface of a model earth 13. The loops 11 and 12 and the battery 10 are interconnected through a commutating device 14 which makes and breaks the circuit at a selected frequency. Conductor 20 connects the positive terminal of battery 10 to contact 21. Similarly conductor 22 extends from the negative battery terminal to contact 23. Contacts 21 and 23 are carried by an insulating bar 24 which is under the control of a cam 25. Upon rotation of cam 25, contacts 21 and 23 are dropped down onto contacts 27 and 29 completing the exciting circuit. The exciting circuit thus extends from contact 29 by way of conductor 30 to loop 11, through conductor 31 to loop 12 and thence by way of conductor 32 to terminal 27. By means not shown, the contacts 27 and 29 may be moved toward or away from contacts 21 and 23 for adjustment of the period of closure of the circuit during each revolution of the cam 25 and thus regulates the length of the current pulse flowing in the exciting circuit. For example, if the contacts are positioned to be closed one-half of each revolution, periodic current pulses 180 electrical degrees in length as illustrated at 35 in Fig. 2 will flow in both loops 11 and 12 in the exciting circuit.

A primary detecting loop 36 is positioned at a selected receiving station on the surface of the earth spaced from the loop 11. Flow of the current pulses 35, Fig. 2, in loop 11 produces a potential in loop 36. The potential induced in loop 36 is proportional to the sum of the boundary wave travelling along the surface from loop 11 plus all waves reflected from various depths.

Flow of the current pulses 35 through loop 12 simultaneously with flow through loop 11 produces a potential on the surface of the model which consists entirely of the boundary wave. This boundary wave potential is detected by a secondary detecting loop 41 connected to a coupling unit 42. The output of the coupling unit 42 is connected in series circuit with primary detecting loop 36 and a measuring circuit including an electronic switch 43. More particularly, conductor 44 extends from one output terminal of unit 42 to one terminal of loop 36. The series circuit is completed by way of conductor 45 extending between loop 36 and one input terminal of the electronic switch 43 and thence by way of conductor 46 to unit 42. The output signals from the loops 41 and 36 are connected in opposite polarity to effect boundary wave cancellation. If the resistivities and spacings satisfy Equation 5, the boundary wave detected by loop 41 will, if of proper amplitude, completely cancel the boundary wave component of the potential detected by the loop 36. To adjust the amplitude of the boundary wave, the ratio of the currents flowing in loops 11 and 12 may be adjusted, as may be required and as indicated by Equation 4, by use of the potentiometer 11a which may be connected across either loop 11 or 12 by switch 11b. With complete cancellation of the boundary wave, the remaining potential detected by loop 36 is applied to a cathode ray oscilloscope 48 through electronic switch 43 and circuit 47. The pattern produced by the remaining potential may be viewed, measured, and/or photographed at the oscilloscope. The character and depth of a subsurface reflecting horizon may be determined by the magnitude and time of arrival of the reflected signal as displayed on the oscilloscope 48.

Figure 2:
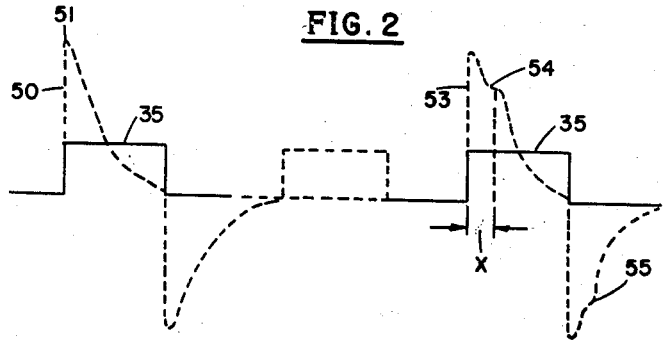
Fig. 2 illustrates input and detected signals obtained using the system of Fig. 1.

Referring to Figs. 1 and 2, application of the current pulses 35 to the model earth 13 through loop 12 produces at the detecting loop 41 a potential pattern or boundary wave 50 having a positive peak 51 substantially coincident with the application of the pulses 35. Thereafter, the curve rapidly decays toward zero. Upon termination of pulses 35, a negative peak 52 is reached and followed by a decay toward zero.

Ordinarily if the potential from the earth detected by loop 36 contains, in addition to the boundary wave, some reflected energy, the presence of such reflected energy may be indicated by slight irregularities 54 and 55 in the total potential wave 53 received. If the time of arrival of the reflected energy causing the minor irregularities 54 and 55 could be measured accurately (for example, the time represented by the angle $x$, Fig. 2), the depth from which the energy was reflected could be calculated. However, since the reflected energy is but a fraction of the total detected signal, positive identification of its presence is difficult and accurate measurement of its time of arrival even more so.

Figure 3:
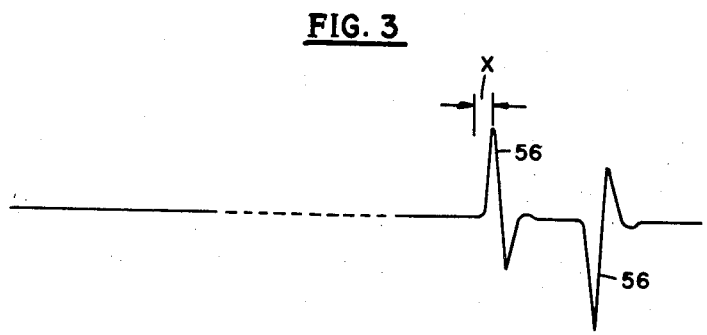
Fig. 3 illustrates an amplified reflected energy component of the detected signals of Fig. 2.

By reversing the polarity of the boundary wave 50 and adding it in proper phase to the potential wave 53, the difference between the two signals represents the reflected energy and appears, Fig. 3, after amplification, as pulse 56, having a definite and measurable arrival time. Measurement of the angle $x$, Fig. 3, is, of course, much more precise than any corresponding measurement in the pattern of Fig. 2.

Figure 4:
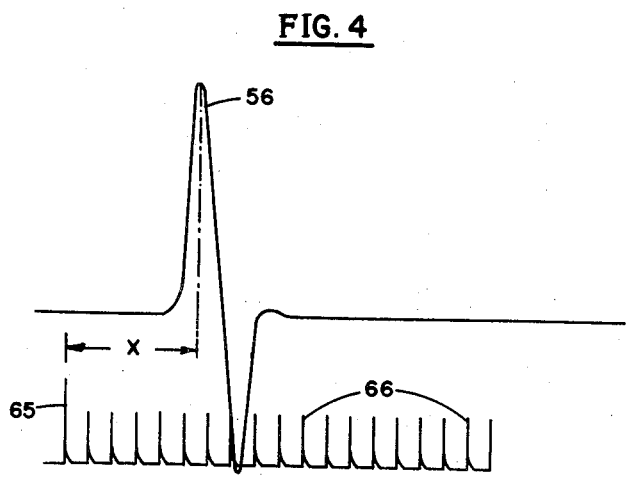
Fig. 4 is an enlarged view of the pattern of the oscilloscope of Fig. 1.

The measurement of the angle $x$, Fig. 3, may be aided, in accordance with the present invention, by projecting on the screen 49 of the oscilloscope 48 a time scale having its zero coinciding with the application of a current pulse 35 to the earth's surface. As shown in Fig. 4, an initial or zero pulse 65 is of larger amplitude than the spaced pulses 66. The spacing between the successive pulses on the time scale is uniform and, as illustrated in Fig. 4, represents time intervals each of which will have a value proportional to the time required for a complete revolution of the shaft 16. More particularly, one form of timing device may comprise a sprocket or pin wheel 60, Fig. 1, made of magnetic material and carried by or driven from the shaft 16. The sprocket 60 may conveniently have 36 spokes dividing the periphery into 10° intervals. A magnet 61 adjacent the pin wheel carries windings 62. A voltage pulse is generated in windings 62 by variation of the reluctance of the flux path each time a spoke on the wheel 60 passes the point of the magnet 61. The output of the coil 62 is applied to one input of the electronic switch 43 and then coupled by way of circuit 47 to the oscilloscope 48 as a time base index. The electronic switch 43 serves the conventional function of providing two traces on the oscilloscope. One trace is a function of the signal to be measured and the other trace is a calibrated time base. Two elongated spokes or pins 63 may be conveniently located on the periphery of wheel 60 diametrically opposite each other. The wheel is then adjusted in angular position for the generation, on each revolution of the shaft 16, of two voltage peaks of relatively large amplitude, one being coincident with the closure and the other with the opening of the exciting circuit by cam 25 with the smaller 10° markers therebetween. The large voltage pulses each appear in zero position on the oscilloscope time base trace.

The reflected signal wave form 56 of Fig. 3 applied to the oscilloscope 48 is also illustrated in the enlarged view of Fig. 4. Pulse 65 generated by pin 63 passing magnet 61 is followed by a series of low amplitude pulses 66. Reference to the pulses 66 spaced at 10° intervals indicates the arrival of the reflected wave 56, approximately 58° after the application of the current pulse 35 of Fig. 2.

Variations in the lapse of time between application of the pulse 35 and the reception of the reflection 56 is indicative of variations in subsurface structures. Although the exact path followed by the energy comprising the reflected pulse 56 is not definitely known, it has been found that the angle $x$ increases proportionally with depth of a reflecting horizon and that depths of such a horizon may be determined. For example, assume that the average velocity is in the order of 25,000 feet per second. At a frequency of 1 C. P. S., the phase angle $x$, Fig. 4, of 58° would represent a travel time $t$ of:

$$t = \frac{58°}{360°} \times 1 = .144 \text{ seconds}$$

If the travel path for the reflected wave is assumed to be vertical, such a travel time would represent a reflection from a horizon at a depth $d$ of:

$$d = \frac{.144 \times 25,000}{2} = 1,800 \text{ feet}$$

Data obtained by the measurements of the type above described may be made at a plurality of stations in a selected area and plotted either as a time interval or, if the velocity is known, as a depth, as is commonly the practice in seismic exploration to delineate subsurface structural character. Where the velocities are not known, time intervals may be plotted. As explained in Electromagnetic Theory by Stratton, McGraw-Hill, first edition, page 276, Equation 50, the velocity varies as the square root of resistivity. Hence, in a given area, changes in the average resistivity such as will ordinarily occur from point to point in the area will not substantially affect the velocity. The time intervals may therefore be taken as representative of variations in depth of subsurface structures.

The model 13 may be of such size that it and all other parts of Fig. 1 enclosed within the dotted outline 79 may be mounted in a truck or other vehicle for transit to desired testing or exploring stations. It has been found that blocks of selected metals having dimensions in the order of 2' square and 4" to 12" thick may be utilized to produce boundary waves having the same character as those encountered in the earth.

The size and material for a suitable model may be selected as follows. A dimension scaling factor Z may be chosen conveniently to fix the relative sizes of the earth and model spread distances, $R_{earth}$ and $R_{model}$. The model may then be provided having the resistivity required by Equation 5. The opposite approach may of course, be followed, i. e., select the model material and calculate from its resistivity, the spread dimensions from Equation 5. It is convenient to use a dimension scaling factor of $Z=12,000$. In such a case, one inch (1") on the model represents one thousand feet (1000') on the earth. For a scaling factor in the order of 12,000, the model earth may conveniently be made of non-ferrous metals which are readily available to satisfy the Equation 5. Metals which may be found suitable are:

| Metal | Resistivity | Resistivity |
|---|---|---|
| | micro-ohm-cm. | ohm-ft. |
| Copper (Cu) | 1.724 | .0565×10⁻⁶ |
| Aluminum (Al) | 2.828 | .0928×10⁻⁶ |
| Magnesium (Mg) | 4.75 | .155×10⁻⁶ |
| Zinc (Zn) | 5.75 | .189×10⁻⁶ |
| Dow Metal | 18.2 | .60×10⁻⁶ |
| Lead (Pb) | 22 | .72×10⁻⁶ |

If a model earth of copper is utilized with a dimension scaling factor of 12,000 the boundary wave will, from Equation 5 have the same shape as found in an area on the surface of the earth where the apparent resistivity is:

$$\rho_{earth} = \rho_{model} \frac{R^2_{earth}}{R^2_{model}} = \rho_{Cu} \frac{(12,000)^2}{1^2} = 8.1 \text{ ohm-ft.}$$

By using a lead model, the boundary wave would correspond in shape with that in an area of the earth's surface where the apparent earth resistivity would be:

$$\rho_e = \rho_{Pb} \frac{(12,000)^2}{1^2} = 103.5 \text{ ohm-ft.}$$

In actual field tests, earth resistivities in the range of from 25 to 80 ohm-feet have been measured. Earth models of certain pure metals and of their alloys having resistivities in the range between that of copper and of lead are to be used to cover the range of resistivities encountered in the field.

It is to be noted that the apparent earth resistivity may change continuously along a traverse from a low value to a relatively high value. If a boundary wave is to be generated having the same shape as that encountered in the earth at various points along such a traverse, some factor affecting the shape of the model boundary wave must be continuously variable. The model resistivity may at best be varied stepwise to satisfy Equation 5, i. e., a model of one resistivity may be substituted for a model of differing resistivity. However, there is no such restriction upon the spacing R between the current and potential loop on the model. The distance $R_{model}$ between loops 12 and 41 may be varied from a first value to a second, differing from the first by any desired increment, for generation and detection of a boundary wave having the same shape as any which might be encountered in the field.

If the earth boundary wave is to be cancelled, not only must the model boundary wave have the same shape but must have the same amplitude. In the system of Fig. 1, if loops 11, 12, 36 and 41 comprise one turn each and have dimensions and spacings corresponding with a given spacing factor Z for which the earth and model boundary waves have the same wave shape, the magnitude of the earth boundary wave will be greater than that of the model boundary wave by a factor equal to the spacing factor Z. In such case, the amplitudes of the two waves may be made equal by either varying the ratio of the currents flowing in loops 11 and 12 as by adjustment of the potentiometer 11a or by amplifying, as in the coupling unit 42, the detected potential from loop 41 by an amount equal to the spacing factor Z. If the factor Z=12,000, the model signal would have to be increased by a factor of 12,000 for cancellation of the boundary wave component of the earth signal. However, loops 12 and 41 may comprise a plurality of turns whereby the detected model signal will be so increased as to be of the same order of magnitude as the earth boundary wave. For example, if loops 12 and 41 have 100 turns each and are used with loops 11 and 36 of 1 turn each, the model potential will be increased in amplitude in proportion to the product of the number of turns (100×100) or by a factor of 10,000. The ratio of the currents flowing in loops 11 and 12 may then be adjusted to compensate for the remaining difference in amplitudes, i. e., the current flowing in loop 12 would be adjusted to a value 1.2 times the current flowing in loop 11.

Figure 5:
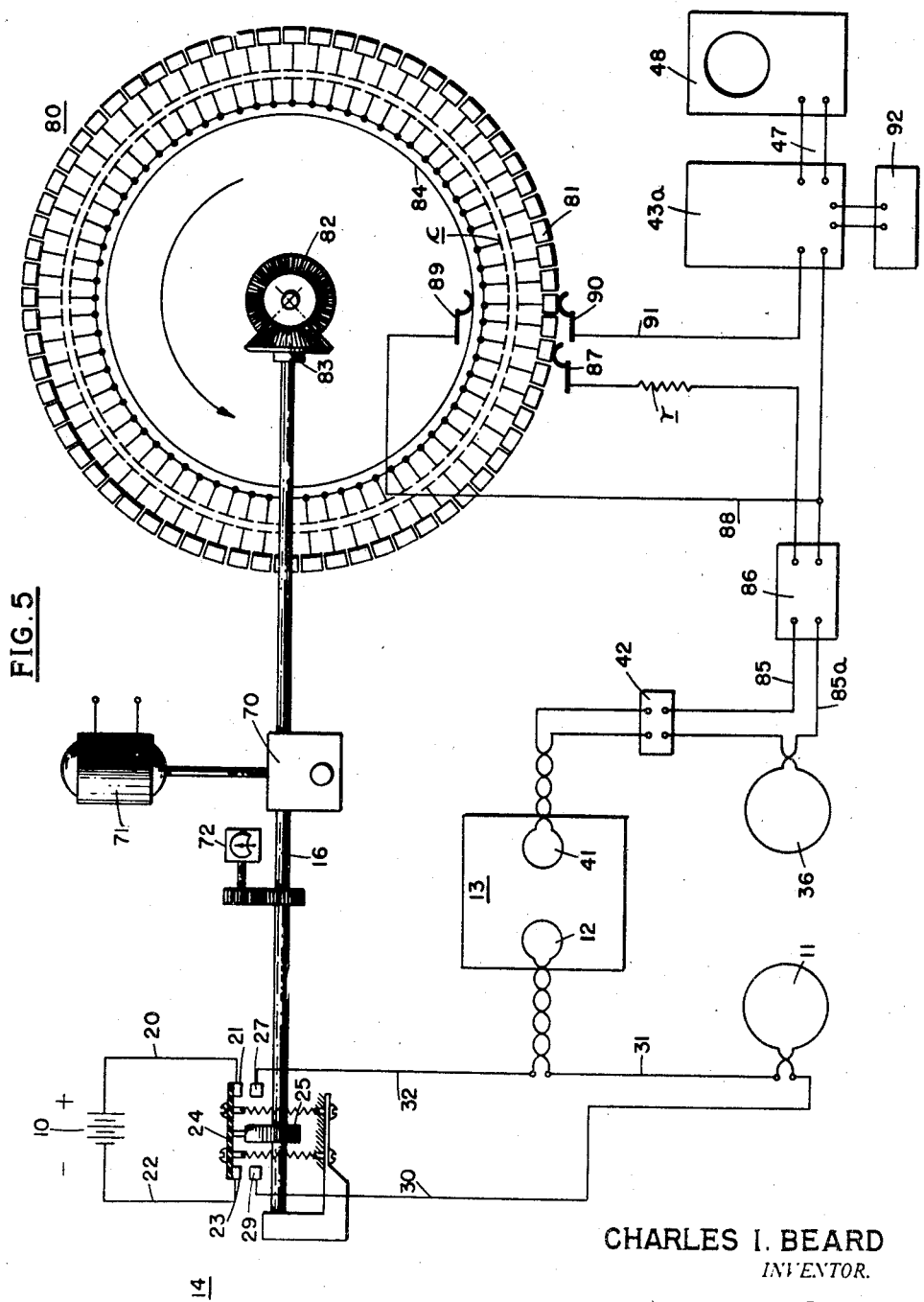
Fig. 5 is a diagrammatic view of the system of Fig. 1 modified to include a noise-eliminating system.

There will now be considered the manner in which the effects of noise energy have been overcome. Noise potentials due to telluric currents and 60 cycle ground currents may be of the order of many times the boundary wave potential. It will be apparent that special provisions must be made to measure a reflection signal but a fraction of the boundary wave potential in the presence of such large amplitude noise energy. One system for accomplishing such measurement is illustrated in Fig. 5. Like parts have been given the same reference characters as in Fig. 1. The system of Fig. 5 includes a memory circuit 80. In the form illustrated, the memory circuit 80 includes a plurality of condensers $c$ with one terminal of each connected to one of the commutator segments 81. The commutator segments 81 may be mounted at the periphery of a cylinder or drum which is driven by way of bevel gears 82 and 83 from the shaft 16. Each condenser has its second terminal connected to a slip ring 84.

The commutator drum is rotated in synchronism with the shaft 16 and makes one complete revolution for each complete pulsing cycle of the commutator 14. The signals detected by loops 36 and 41 and mixed in phase opposition are connected by way of conductors 85 and 85a through an amplifier generically illustrated by block 86 to the memory circuit 80. More particularly, conductor 85 leads from unit 42 through amplifier 86 to resistor $r$ and thence to a brush 87 in contact with the periphery of the commutator cylinder. Conductor 85a extends from one terminal of loop 36 to amplifier 86. The circuit is completed from amplifier 86 through conductor 88 to a brush 89 in contact with slip ring 84.

As each commutator segment 81 passes and is in contact with the brush 87, the condenser $c$ connected thereto receives an incremental charge proportional to the voltage during the interval of contact. The brush 87 is so designed that it will not short circuit adjacent commutator segments to discharge the associated condensers. If the detected potential were free of noise, the variation in charge on the condensers oriented about the commutator drum would correspond with the signal itself. By providing the series resistance $r$ in the charging circuit, the rate at which the conductors are charged is controlled. By making the charging period sufficiently long, the effect of a single high amplitude random noise impulse is less than the total effect of the signal and thus the noise potentials generally will be cancelled or will be averaged out after the commutator cylinder is rotated for a considerable length of time. On the other hand, since the signal itself is recurrent, each condenser will be charged in steps to a voltage proportional to the detected potential. The action of the memory circuit in eliminating noise energy will perhaps be better understood from the following brief explanation. The charging time for each condenser $c$ is equal to the product $rc$. The increase in charge on each condenser $c$ as a function of time is exponential in character. If the time constant $rc$ is made long, the charge stored in any one condenser $c$ while in circuit with the loops 36 and 41 will be but a small portion of the total charge after the commutator has been rotated a great number of times. Thus, if the voltage applied to the memory circuit contains random noise impulses, any single impulse will have a negligible effect on the total charge because a single condenser is not connected thereto for a sufficient period of time to permit accumulation of a substantial charge. However, the condensers $c$ receive an incremental charge due to the desired signal each time they are successively in circuit with the loops. Ultimately, the charge on each of the condensers is determined substantially entirely by the magnitude of the desired signal which repeatedly appears during a given angle corresponding to the position of the condenser in the memory circuit. Further, noise energy generated in amplifier 86 which is random in nature will also be eliminated thus permitting additional amplification of the signal in the circuit between the memory circuit 80 and oscilloscope 48. Ordinarily, amplifier noise would prevent as great amplification of the reflected signal as is desired for deflection of the oscilloscopic trace.

Sixty cycle noise energy may be eliminated by the same process if the frequency of the pulsing cycle is made an odd sub-multiple of 60 C. P. S. whereby the component of the applied voltage due to 60 cycle voltages is alternately positive and negative for successive applications of the voltage to a given condenser in the memory circuit.

With the detected signal stored on the memory circuit 80, a high impedance measuring circuit coupled to the oscilloscope 48 may be utilized for observation and/or measurement of the stored potential. More particularly, a pick-off brush 90 is connected by way of conductor 91 to the input of the circuit 43a which may be the electronic switch 43 of Fig. 1 or may be a simple mixing network. If the input of the circuit 43a is high impedance, the signal stored in the memory circuit will not be significantly altered by detection of the potential for measurement.

With the system illustrated in Fig. 5, the procedures above-described in connection with the system of Fig. 1 may be employed for boundary wave cancellation in order that the reflected waves themselves may be measured and studied. A source of timing pulses 92 may be utilized to provide a time base for measurement of the delay angle $x$, Fig. 3. The source 92 may be controlled electronically, or mechanically, as is the wheel 60, Fig. 1, to synchronize timing pulses with the current pulses and may be applied to the oscilloscope 48 as a separate trace by use of an electronic switch 45, Fig. 1, or may appear as pips superimposed on the signal as may be accomplished in circuit 43a of any suitable type.

The foregoing description has been directed to the cancellation of the boundary wave component of a signal in the earth at one location. An extensive survey utilizing the boundary wave cancellation procedure as above outlined over a substantial area to locate subsurface anomalous structures such as domes or faults, etc., would be carried out as described below.

A base station is selected preferably in an area where, from known geology, there is no indication of the presence of substantial subsurface anomalies. The primary loops 11 and 36 are positioned at a spacing $R_{earth}$ of, for example, 3,000 feet apart. The motor 71 is then energized to drive the cam shaft 16 at a selected frequency in the range of from ½ to 30 C. P. S. as indicated by the tachometer 72, Figs. 1 and 5. The periodic current pulses are applied simultaneously to the series current loops 11 and 12. The loop 12 will be firmly glued or otherwise fixed to the surface of the model 40 and insulated therefrom. Potential loops 36 and 41 connected in series opposing relation in the detecting circuit are connected through the memory circuit 80, Fig. 5, to the circuit 43a. The summation of the signals detected by two detecting loops is then viewed on the screen 49 of the oscilloscope 48. For a spread distance $R_{earth}$ of 3,000 feet, the model spread distance $R_{model}$ will be initially 3 inches. If the resistivity of the earth and of the model are such that Equation 5 is satisfied, the wave detected in loops 36 and 41 will have exactly the same shape and will differ only in amplitude. If the model loops 12 and 41 comprise 100 turns each, the amplitude difference in the earth and model signals will as above explained be in the ratio of 1.2/1. By varying either the gain of an amplifier incorporated in coupling unit 42 or the ratio of the currents flowing in loops 11 and 12 as by adjustment of potentiometer 11a, the amplitudes are made exactly equal. The foregoing adjustment may be made while viewing the algebraic sum of the detected signals on the oscilloscope 48. As total cancellation is approached, the gain of oscilloscope amplifier may be increased for more accurate adjustment. The loops 12 and 41 may then be rigidly secured to the model in their adjusted positions. Thereafter, the loops 11 and 36 comprising the earth spread are progressively moved at, for example, 500′ intervals to other selected stations along the selected traverse. If the resistivity of the earth remains constant along the traverse, the boundary wave will be cancelled at each measuring station without further adjustment of the spacing R of the loops on the model.

If the traverse extends over subsurface reflecting structures, the reflected energy will appear as an impulse on the otherwise straight trace on the tube 49. The observed delay angles may then be plotted as ordinates on a graph with the stations along the traverse plotted as abscissas.

For field use, two or three model earths might be selected and carried with the exploring apparatus. For example, models of low resistivity (copper), intermediate resistivity (magnesium), and high resistivity (Dow metal) could be utilized. In such case, the resistivity of the model earth could be varied stepwise, i. e., using one or the other of the three models selected. The spacing $R_{model}$ (which is a continuous variable) could then be adjusted to match precisely the earth boundary wave for any value of earth resistivity as would be encountered in practice.

The system above illustrated and described utilizes inductive loops both on the input and the output ends of the system. It is to be understood that straight wire radiators might be utilized in place of the loops. More particularly, an antenna, of length substantially equal to the diameter of each corresponding loop grounded at its two extremities and excited at its center, could be used either on the current or potential side of the system, or both. If such linear antennas are used, it will be found advisable, as is well recognized in the art of electrical prospecting, to use current pulses alternately of opposite polarity to eliminate polarization effects. With the use of linear antennas both on the model and on the earth, the same considerations as to spacing factor and amplification of the model signal for cancellation of the boundary wave component of the earth signal would be required as with the use of loops.

Figure 6:
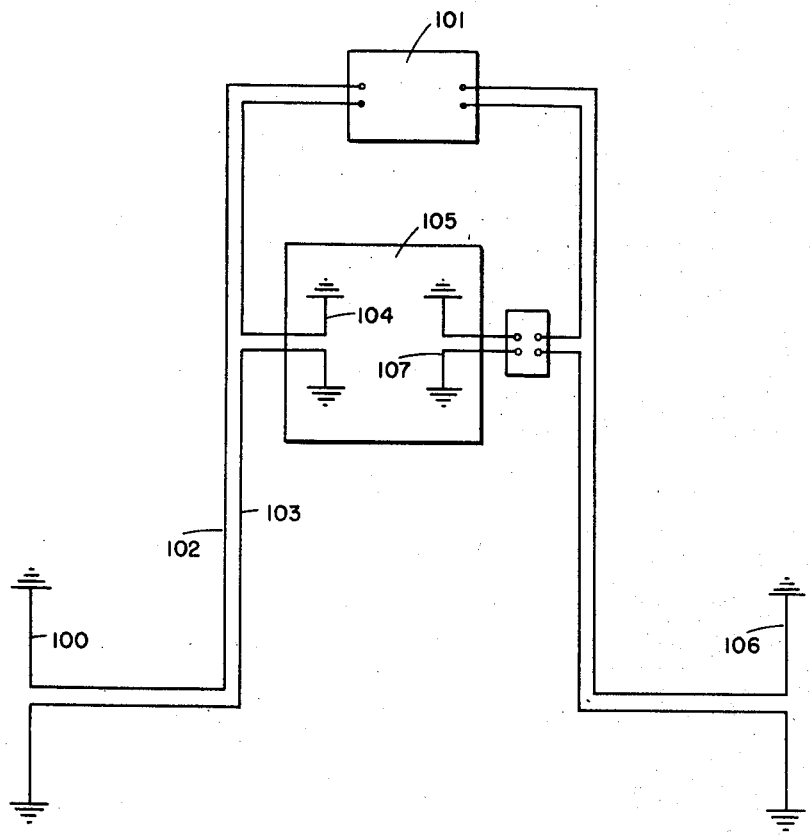
Fig. 6 is a simplified wiring diagram illustrating the use of grounded radiating conductors in place of the inductive loops of Fig. 1.

A preferred spread orientation using linear radiators is illustrated in Fig. 6. The current antenna 100 may be 500 feet in length grounded at both ends and connected to a control unit 101 of spaced current pulses alternately of opposite polarity by way of conductors 102 and 103. A scaled linear antenna 104 is positioned on the model earth 105 and connected in series circuit with the antenna 100. Current pulses then flow from the control unit 101 simultaneously through antennas 100 and 104. The control unit 101 may include a source of direct current and suitable commutating device such as are commonly used in the art.

A detecting antenna 106 is spaced a selected distance, for example, 3,000 feet from the current antenna 100. Antennas 100 and 106 are oriented with their lengths parallel and are perpendicular to a line connecting their centers. Such a spread configuration may conveniently be termed an "H-spread." A potential antenna 107 is positioned on the model 105 to form with antenna 104 a scaled H-spread. If, as discussed in connection with the system of Fig. 1, the resistivity of model 105 matches the resistivity of the earth, for a spacing factor Z of 12,000, one inch on the model will correspond with 1,000 feet on the earth spread. As in the case of the system using loops, the signal detected by antenna 107 must be amplified by a factor of Z, i. e., 12,000 in order to have the same amplitude as the boundary wave component of the potential detected by antenna 106 for cancellation thereof. The control unit 101 preferably includes the memory circuit and oscilloscope of Fig. 5 for measurement of the reflected signal component after boundary wave cancellation.

By using either the system of Figs. 1 and 5 or of Fig. 6, the boundary wave component of the detected potential may be cancelled, leaving for measurement in absolute magnitude the reflected signal.

Although, in the present description pulses of 180° in length have been illustrated, it is to be noted that other pulse lengths may be utilized. For example, pulses as short as 20° have been used at frequencies between ½ and 30 C. P. S. The use of loops rather than linear antennas in the detecting circuit is preferred in order to avoid excessive noise energy in the form of conductive current in the grounded radiators. The problem of adjusting the amplitude of the signal generated in a model for boundary wave cancellation is minimized by the use of loops both on the current and potential ends of the system since the plurality of turns in the loops on the model affords a ready means of increasing the amplitude of the signal from the model and substantially avoids the need to provide high eelctrical amplification.

While for the purpose of illustrating and describing the present invention certain steps and specific circuit arrangements have been described and illustrated, it is to be understood that the invention is not to be limited thereto since there may be variations in the method steps, in the circuit arrangements, and in the instrumentalities employed therein within the spirit and scope of the invention as set forth in the following claims.

What is claimed is:

1. The method of detecting resistance inhomogeneities in an electrically conducting body which comprises applying to said body at a sending station a pulse of electrical energy, some of which travels downwardly through the body and some of which travels along the body-air interface as a boundary wave whose shape depends upon the resistivity of that portion of the body through which it travels, at a detecting station spaced from the point of application of said pulse detecting a signal comprising the sum of the boundary wave and an upwardly reflected energy wave resulting from reflection of downwardly traveling energy from electrically contrasting subsurface interfaces, in a zone electrically isolated from the region of said sending and detecting stations generating a boundary-cancellation wave having the same shape said detected signal would have if the body were homogeneous in terms of electrical resistivity, applying said cancellation wave in opposition to the detected signal to leave a remaining signal due substantially entirely to reflected energy, and measuring said remaining signal for location of said interfaces.

2. The method of electrical prospecting which comprises applying to the earth's surface at a sending station a pulse of electrical energy some of which travels downwardly and some of which travels along the earth-air interface as a boundary wave whose shape depends upon the resistivity of the earth through which it travels, at a detecting station spaced from the point of application of said pulse detecting a signal comprising the sum of the boundary wave and an upwardly reflected energy wave resulting from reflection of downwardly traveling energy from electrically contrasting subsurface interfaces, in a zone electrically isolated from the region of said sending and detecting stations generating a cancellation wave having the same shape said detected signal would have in the absence of reflected energy, applying said cancellation wave in opposition to the detected signal to leave a remaining signal due substantially entirely to reflected energy, and measuring said remaining signal for location of said interfaces.

3. The method of electrical prospecting which comprises applying to the earth's surface at a sending station pulses of electrical energy, some of which travel downwardly and some of which travel along the earth-air interface as a boundary wave whose shape depends upon the resistivity of the earth through which it travels, at a detecting station spaced from the point of application of said pulse detecting a signal comprising the sum of the boundary wave and an upwardly reflected energy wave resulting from reflection of downwardly traveling energy from electrically contrasting subsurface interfaces, in a zone electrically isolated from the region of said sending and detecting stations generating coincidentally with said boundary wave a cancellation wave having the same shape said detected signal would have in the absence of reflected energy, applying said cancellation wave in opposition to the detected signal to leave a remaining signal due substantially entirely to reflected energy, and measuring the time interval between the application of each pulse of electrical energy and the time of arrival at said detecting station of reflected energy due to each said pulse for location of the depth of said interfaces.

4. The method of electrical prospecting which comprises applying to the earth's surface at a sending station a pulse of electrical energy, some of which travels downwardly and some of which travels along the earth-air interface as a boundary wave whose shape depends upon the resistivity of the earth through which it travels, at a detecting station spaced from the point of application of said pulse detecting a signal comprising the sum of the boundary wave and an upwardly reflected energy wave resulting from reflection of downwardly traveling energy from electrically contrasting subsurface interfaces, also applying said impulse to a conductive body whose resistivity is uniform and corresponding with a scaled-down factor of the resistivity of the earth to which said impulse is applied, the thickness of said body in its scaled-down dimensions being greater than the corresponding depths in the earth to be investigated, some of the energy of said applied impulse traveling along the earth-air interface of said body as a boundary wave whose shape is substantially identical with the boundary wave produced along the earth-air interface, detecting said boundary wave on said body at a distance from the application of the impulse thereto such that the detected cancellation boundary wave is identical in shape with that of the boundary wave produced along the earth-air interface, amplifying the cancellation boundary wave to make its amplitude equal to that of the boundary wave along the earth-air interface, applying said cancellation wave in opposition to the detected signal to leave a remaining signal due substantially entirely to reflected energy, and measuring said remaining signal.

5. The method of electrical prospecting which comprises applying to the earth's surface at a sending station a pulse of electrical energy, some of which travels downwardly and some of which travels along the earth-air interface as a boundary wave whose shape depends upon the resistivity of the earth through which it travels, at a detecting station spaced from the point of application of said pulse detecting a signal comprising the sum of the boundary wave and an upwardly reflected energy wave resulting from reflection of downwardly traveling energy from electrically contrasting subsurface interfaces, also applying said pulse at a sending station to a conductive body having resistivity and dimensional characteristics forming a scaled-down replica of a homogeneous subsurface structure of the earth's surface under investigation, detecting at a detecting station located on said conductive body a boundary wave, the sending and detecting stations on said body having a separation distance related by the same factor as the separation distance between the corresponding stations on the earth for detection at the detecting station of a boundary wave of substantially identical shape with the boundary wave detected at the detecting station on the earth, applying said cancellation wave in opposition to the detected signal to leave a remaining signal due substantially entirely to reflected energy, and measuring said remaining signal.

6. The method of electrical prospecting which comprises applying to the earth's surface at a sending station a pulse of electrical energy, some of which travels downwardly and some of which travels along the earth-air interface as a boundary wave whose shape depends upon the resistivity of the earth through which it travels, at a detecting station spaced from the point of application of said pulse detecting a signal comprising the sum of the boundary wave and an upwardly reflected energy wave resulting from reflection of downwardly traveling energy from electrically contrasting subsurface interfaces, also applying said pulse at a sending station to a conductive body having resistivity and dimensional characteristics forming a scaled-down replica of a homogeneous subsurface structure of the earth's surface under investigation, detecting at a detecting station located on said conductive body a boundary wave, the spacing between said sending and detecting stations on said body being equal to the product of the spacing between the sending and detecting stations on the earth and the square root of the ratio of the resistivity of the material between the sending and detecting stations on said body to the resistivity of the earth between its sending and receiving stations for production of a cancellation wave having the same shape as the boundary wave detected at the detecting station on the earth, applying said cancellation wave in opposition to the detected signal to leave a remaining signal due substantially entirely to reflected energy, and measuring said remaining signal.

7. The method of electrical prospecting in an area characterized by the presence of high amplitude random noise impulses of varying polarity which comprises applying to the earth's surface repeated pulses of electrical energy to generate boundary and subsurface waves, at a detecting station spaced from the point of application detecting a signal comprising the sum of said boundary wave, said subsurface waves reflected from subsurface interfaces and said noise impulses, in a zone electrically isolated from the region of said sending and detecting stations generating coincidentally with said boundary wave a cancellation wave having the same shape as said detected signal would have in the absence of reflected subsurface wave energy and said noise impulses, applying said cancellation wave in opposition to the boundary wave component of said detected signal leaving a remaining signal due substantially entirely to the sum of said reflected energy and said noise impulses, chopping said remaining signal into a plurality of successive components, in succession converting each voltage component into an incremental charge which is a function of the amplitude of the applied component of said remaining signal, storing each of said charges, said noise impulses averaging to a negligible value in each component whereby said stored charges form a composite stored signal corresponding with the reflected wave component of said remaining signal and unaffected by said noise impulses, and measuring said composite signal.

8. The method of measuring electrical signals of given frequency applied to a circuit in the presence of random electrical noise which comprises repeatedly integrating at said frequency substantially like instantaneous components of said signals, upon each integration storing energy proportional to the average value of each of said components, the integration of said components being performed during time intervals in which the amplitude and polarity of said random noise changes, the value of said integrated component being substantially unaffected by said random noise, and measuring said stored energy in the sequence of integration of said components to produce said electrical signal free from random noise.

9. The method of measuring the periodically reoccurring signal component of a voltage which includes said signal component and noise energy of random polarity and amplitude which comprises detecting said voltage for a plurality of time intervals each of which is short compared to the period of one cycle of said signal, repeatedly converting said detected voltage into incremental charges in number equal to said time intervals, said incremental charges for each conversion being an integration function of the sum of said periodically reoccurring signal and said random noise, storing said charges for each conversion of said detected voltage, the random noise averaging to a negligible value for a plurality of conversions, said stored charges successively building up to total charges respectively proportional to the amplitude of said periodically reoccurring signal during said time intervals, and measuring said stored charges in the sequence of said time intervals to produce said periodically reoccurring signal free from said random noise.

10. The method of measuring the periodic signal component of an electrical voltage consisting of random noise energy of varying polarity and amplitude combined with said periodic signal which comprises repeatedly chopping said voltage into a plurality of successive components at a rate proportional to the frequency of said periodic signal, in succession and for each chopping operation converting each voltage component into an incremental charge which is an integration function of the peak amplitude of the converted component, storing said charges to produce a plurality of total charges proportional to the respective amplitudes of the periodic signal portion of said plurality of components, the random noise in each component averaging to a negligible value during the periods of storage thereof, and measuring said stored charges in the chopping sequence to obtain the waveform of the periodic signal unmasked by the random noise.

11. The method of measuring the time occurrence of a periodically reoccurring electrical signal in the presence of noise energy of random polarity and amplitude, which comprises detecting said signal for a time interval short compared to the period of one cycle of said signal, repeatedly converting said detected signal into an incremental charge which is a function of the amplitude of said signal during said time interval, storing said charge, the random noise averaging to a negligible value during said time interval, and varying the phase angle between a selected point on said current pulses and said time interval to determine the phase angle of the occurrence of said signal with respect to said current pulses.

12. The method of measuring an electrical voltage consisting of a periodic signal including random noise energy of varying polarity and amplitude which comprises repeatedly chopping said voltage into a plurality of components, repeatedly converting a successively appearing selected one of said plurality of components into an incremental charge related to the peak amplitude of the selected component, storing said incremental charge, successively increasing the stored charge by repeated conversion of said selected component until said stored charge corresponds with a potential difference substantially equal to the periodic signal portion of said selected component independent of the random noise energy, the components of said incremental charge due to said random noise energy averaging to a negligible value as successive incremental charges are stored, and measuring the potential difference due to said stored charge to obtain the value of said periodic signal portion of said selected component in the absence of effect by said random noise energy.

13. The method of measuring the periodic signal component of an electrical voltage having a high random noise to signal ratio which comprises repeatedly applying said voltage at a rate equal to the repetition rate of said periodic signal to a measuring circuit, dividing said voltage into a number of intervals in time, and upon each application integrating said voltage over each of said intervals in sequence, only a small portion of the complete integration being performed during each application, storing the sum of the integrations in each interval in said sequence, the random noise averaging to a very small value in comparison to the signal component after a plurality of such integration-storing operations, and measuring after said plurality of operations the sum of said stored integrations in the storing sequence to obtain the waveform of said periodic signal unmasked by said random noise components.

14. A system for detecting inhomogeneities in an electrically conducting body which comprises sending means positioned at a first station on said body for applying to said body pulses of electrical energy, some of which travel downwardly through the body and some of which travel along the body-air interface as a boundary wave whose shape depends upon the resistivity of that portion of the body through which it travels, receiving means positioned at a second station on said body and spaced from said first station for detecting a signal comprised of the sum of said boundary wave and an upwardly reflected energy wave resulting from reflection of downwardly traveling energy from contrasting subsurface interfaces, a homogeneous body electrically isolated from said first body, means positioned on the surface of said homogeneous body and in circuit with said sending means at said first station for generating in said homogeneous body a boundary wave corresponding with the boundary wave in said first body, receiving means connected in circuit with said first named receiving means for detecting said boundary wave in said homogeneous body, and measuring means connected to said receiving means for measuring the difference between said boundary wave from said homogeneous body and said signal detected from said first body.

15. An electrical prospecting system which comprises sending means positioned at a first station on the earth's surface for applying pulses of electrical energy, some of which travel downwardly through the earth and some of which travel along the earth-air interface as a boundary wave whose shape depends upon the resistivity of that portion of the earth through which it travels, receiving means positioned at a second station on the earth's surface spaced from said first station for detecting a signal comprised of the sum of said boundary wave and an upwardly reflected wave resulting from reflection of downwardly traveling energy from contrasting subsurface interfaces, a homogeneous conducting body electrically isolated from the earth, means positioned on the surface of said body and in circuit with said sending means on the earth's surface for generating in said body a boundary wave corresponding with the boundary wave in the earth, receiving means connected in circuit with said first named receiving means for detecting said boundary wave from said homogeneous body, and means in circuit with said receiving means for measuring the difference between the boundary wave from said body and said signal from the earth.

16. An electrical prospecting system which comprises sending means positioned at a first station on the surface of the earth for applying to the earth pulses of electrical energy, some of which travel downwardly through the earth and some of which travel along the earth-air interface as a boundary wave whose shape depends upon the resistivity of that portion of the earth through which it travels, receiving means positioned at a second station on the earth's surface spaced a selected spread distance from said first station for detecting a signal comprised of the sum of said boundary wave and an upwardly reflected energy wave resulting from reflection of downwardly traveling energy from contrasting subsurface interfaces, a homogeneous conducting body electrically isolated from the earth, means positioned on the surface of said body and in circuit with the sending means at said first station on the earth's surface for generating in said homogeneous body a boundary wave, receiving means on said body spaced from the sending means thereof a distance equal to said spread distance multiplied by the square root of the ratio of the resistivity of said body to the resistivity of the earth between said sending and receiving stations for producing in said last named receiving means a boundary wave having the same shape as the boundary wave detected at the detecting station on the earth, and a measuring circuit including both of said receiving means for measuring the difference between the boundary wave detected from said body and said signal detected from the earth.

17. An electrical prospecting system which comprises a source of direct current, a primary exciting loop positioned on the earth's surface, a conducting body electrically isolated from the earth, a secondary exciting loop on the surface of said body and in circuit with said primary exciting loop, commutating means for intermittently applying said source to both of said loops, a primary detecting loop on the surface of the earth spaced from the primary exciting loop a selected distance for detecting potentials resulting from application of said direct current to said primary exciting loop, a secondary detecting loop positioned on the surface of said body and spaced from said secondary exciting loop a distance equal to said spread distance multiplied by the square root of the ratio of resistivity of said body to the resistivity of said earth, and measuring circuits connected to both of said detecting loops for measuring the difference between the signals induced therein.

18. An electrical prospecting system which comprises a primary exciting loop positioned at a selected station on the surface of the earth, a scaled resistive replica of a portion of the earth including said selected station, a secondary exciting loop positioned on said replica, means for simultaneously applying current pulses to both of said loops for transmission of electrical energy to said earth and said replica, a primary detecting loop spaced a selected spread distance from said primary exciting loop for detection of potentials resulting from application of said current pulses to the earth, a secondary detecting loop on the surface of said replica spaced a scaled spread distance from said secondary exciting loop, a memory circuit connected to both of said loops and synchronized with said pulse applying means for storing the difference between the potentials detected in said detecting loops, and means for measuring in synchronism with said pulse applying means the signal stored in said memory circuit.

19. In an electrical system in which there appears a voltage comprised of repeatedly occurring signals which are to be measured and relatively high amplitude random noise, the combination comprising a plurality of capacitors, circuit controlling means including a high resistance path for repeatedly applying to each of said capacitors at the rate of occurrence of said signals selected successive components of said voltage for the accumulation on each capacitor of a charge related to said selected component and determined in part by said high resistance path, and means for measuring in the sequence of application of said voltage to said capacitors the potential difference across each capacitor for reproduction of said repeatedly occurring signal unmasked by said random noise.

20. In an electrical system in which a control unit is utilized for generation of repeatedly occurring signals and in which there appears a voltage comprised of potentials resulting from said signals which are to be measured and high amplitude random noise, the combination comprising a plurality of capacitors, circuit controlling means including a high resistance path for repeatedly applying to each of said capacitors selected successive components of said voltage for accumulation on each capacitor of a charge related to said selected component and determined at least in part by said high resistance path, a common coupling between said signal producing control unit and said voltage measuring circuit controlling means for applying said voltage to said capacitors at the rate of occurrence of said signals, and means for measuring, in the sequence of application of said voltage to said capacitor, the potential difference across each capacitor for reproduction of said potentials unmasked by said random noise.

21. In an electrical prospecting system in which there appears a voltage comprised of repeatedly occurring signals which are to be measured and relatively high amplitude random noise signals, the combination comprising a plurality of capacitors, circuit controlling means including a high resistance path for repeatedly applying to each of said capacitors at the rate of occurrence of said signals selected successive components of said voltage for accumulation on each capacitor of a charge related to said selected components and determined in part by said high resistance path, means including an oscilloscope for detecting in the sequence of application of said voltage to said capacitors the potential difference across each capacitor for reproduction of said repeatedly occurring signals unmasked by said random noise, and means for producing timing signals on said oscilloscope one of which is characteristically different from the other, said timing signal producing means being synchronized with the production of said repeatedly occurring signal for a time measurement thereof.

CHARLES I. BEARD.

No references cited.